United States Patent [19]

Drain et al.

[11] Patent Number: 4,756,787
[45] Date of Patent: Jul. 12, 1988

[54] COMPOSITIONS CURABLE BY IN SITU GENERATION OF CATIONS

[75] Inventors: Kieran F. Drain, Madison Heights, Mich.; David J. Dunn, Aurora, Ohio

[73] Assignee: Loctite Corporation, Newington, Conn.

[21] Appl. No.: 118,484

[22] Filed: Nov. 6, 1987

Related U.S. Application Data

[63] Continuation-in-part of Ser. No. 821,570, Jan. 22, 1986, Pat. No. 4,717,440.

[51] Int. Cl.$^4$ .................... C08G 59/68; C08F 4/08
[52] U.S. Cl. ................... 156/310; 156/307.3; 156/327; 156/330; 526/144; 526/195; 526/204; 528/13; 528/14; 528/19; 528/89; 528/90; 528/91; 528/92; 528/93; 528/95; 528/361; 528/408; 528/409; 525/506; 525/507

[58] Field of Search ............. 156/307.3, 310, 327, 156/330; 526/144, 195, 204; 528/88, 89, 13, 14, 19, 91, 93, 90, 92, 95, 361, 408, 409; 525/506, 507

[56] References Cited

U.S. PATENT DOCUMENTS

| | | | |
|---|---|---|---|
| 4,069,055 | 1/1978 | Crivello | 96/115 R |
| 4,092,296 | 5/1978 | Skiff | 260/47 EP |
| 4,138,255 | 2/1979 | Crivello | 96/35.1 |
| 4,173,551 | 11/1979 | Crivello | 528/91 X |
| 4,238,587 | 12/1980 | Crivello | 526/192 |
| 4,241,204 | 12/1980 | Crivello | 526/195 X |
| 4,283,312 | 8/1981 | Crivello | 528/88 X |
| 4,314,917 | 2/1982 | Wolfrey | 528/91 X |
| 4,321,351 | 3/1982 | Zuppinger et al. | 528/91 |
| 4,342,673 | 8/1982 | Wolfrey | 528/91 X |
| 4,387,216 | 6/1983 | Irving | 528/91 X |
| 4,393,185 | 7/1983 | Berner et al. | 528/88 X |
| 4,396,754 | 8/1983 | Brownscombe | 528/89 |
| 4,447,586 | 5/1984 | Shimp | 528/91 X |
| 4,543,397 | 9/1985 | Woods et al. | 525/455 |
| 4,554,341 | 11/1985 | Allen | 528/88 X |
| 4,565,837 | 1/1986 | Drain et al. | 528/91 X |
| 4,581,436 | 4/1986 | Corley | 528/88 X |

FOREIGN PATENT DOCUMENTS

109851 5/1984 European Pat. Off. .

OTHER PUBLICATIONS

Hall, H. K. Jr. and Gotoh, T., "Zwitterionic Tetramethylene Intermediates", Polymer Preprints, *ACS Div. Poly. Chem.*, vol. 26(1), pp. 34–35 (1985).

*Primary Examiner*—Earl Nielsen
*Attorney, Agent, or Firm*—Steven J. Hultquist

[57] ABSTRACT

A co-curable composition, having utility as a first part of a two-part cationically curable composition and containing a latent curing component which is reactive with a latent curing component in a second part of the two-part composition to form curingly effective cations for the two-part composition, such co-curable composition comprising: (i) a cationically polymerizable material, and (ii) a dioxane-complexed metal salt of a non-nucleophilic anion. Also disclosed is a two-part composition curable by contact of respective parts with one another, comprising first and second parts of the aforementioned types. A preferred class of cation species comprises carbenium ions derived from reaction of an organic halide compound, as the first component, with a metal salt of a non-nucleophilic anion such as $SbCl_6^-$, $SbCl_3^-$, $SbF_6^-$, $AsF_6^-$, $SnCl_5^-$, $PF_6^-$, $BF_4^-$, $CF_3SO_3^-$, and $ClO_4^-$, as the second component. The respective parts of the two-part composition may be applied to matable surfaces which then are contacted to effect rapid bonding cure of the composition.

32 Claims, No Drawings

COMPOSITIONS CURABLE BY IN SITU GENERATION OF CATIONS

CROSS REFERENCE TO RELATED APPLICATION

This application is a continuation-in-part of U.S. application Ser. No. 821,570 filed Jan. 22, 1986, now U.S. Pat. No. 4,717,440 in the names of Kieran F. Drain and David J. Dunn.

BACKGROUND OF THE INVENTION

1. Field of the Invention

This invention generally relates to compositions comprising cationically polymerizable materials which are curable in a short time, e.g., fixturing in approximately one minute or less and reaching full properties within a short time thereafter, in the manner of cyanoacrylates.

More specifically, the present invention relates to curable compositions comprising cationically polymerizable materials wherein rapid cure is achieved by the in situ generation of cations, which function as catalytic species for the cure of such materials, and to two-component adhesive compositions which in use are applied one component to each of two matable surfaces with rapid cure occurring on mating of the surfaces.

2. Description of the Related Art

As discussed in our copending U.S. patent application Ser. No. 669,189, filed Nov. 7, 1984, a major disadvantage of prior art fast cure epoxies curable at room temperature conditions, e.g., mercaptan cured epoxies, is that rapid gellation of such materials retards the development of full properties due to the restriction of molecular motion and the cure mechanism involved. Extremely fast cures in these compositions result in overly plasticized products due to the need to use a high level of the curative component. Further, for conventional amine- or mercaptan-cured epoxies, there is a critical mix ratio or stoichiometry for the epoxy resin/curing agent (hardener) mixture, with thorough mixing necessary to achieve full cure.

In the aforementioned copending patent application, we have described storage stable dispersions of stable carbocation salts as initiators for polymerizing epoxy resins to high molecular weight solids. Specifically disclosed in such application are two-part adhesive compositions of a type exhibiting rapid room temperature cure, which in a first part comprise an oxirane functional resin and in a second part comprise a stable carbenium ion salt, i.e., a triphenylmethyl or tropylium salt in a suitable carrier.

In epoxy compositions of the type exemplified in the above-described application, carbocation initiators cause spontaneous epoxy polymerization and thus generally are dispersed in an unreactive carrrier; as such, the respective components require thorough mixing to produce a homogeneous polymeric solid. In many instances, the requirement of such thorough mixing is at odds with the rapid cure nature of the composition, and may result in premature fixturing of the composition prior to its application to the desired substrate.

Illustrative of the prior art usage of other curing agents which effect spontaneous polymerization when mixed with a separate epoxy resin component are U.S. Pat. No. 4,396,754, which teaches an epoxy curing catalyst selected from lithium or Group II metal salts of a non-nucleophilic acid, including $LiBF_4$, $Ca(BF_4)_2$, $Mg(BF_4)_2$, $LiPF_6$, $Ca(PF_6)_2$, $Mg(PF_6)_2$, $LiSbF$, $LiAsF_6$ and the like, and U.S. Pat. No. 4,092,296, which teaches to utilize metallic fluoroborate salts, e.g., salts of tin, copper, zinc, nickel, lead and silver, in aqueous solution as epoxy curing agents. See also U.S. Pat. Nos. 4,069,055 and 4,138,255 to J. V. Crivello which disclose the cationic polymerization of epoxy resins by radiation sensitive aromatic onium salts of Group VA and VIA.

The aforementioned U.S. Pat. No. 4,092,296 teaches the use of silver tetrafluoroborate but shows it by example to be a poor single catalyst (Examples 192–197; see column 23, line 51-column 24, line 22). All other metallic salts disclosed in the U.S. Pat. Nos. 4,396,754 and 4,092,296 patents are characterized by short shelf lives due to their activity as single catalysts, i.e., their spontaneous high reactivity with epoxy resins.

In our copending U.S. patent application Ser. No. 821,570 filed Jan. 22, 1986, there is disclosed a two-part composition curable by contact of respective parts with one another, comprising: a first part comprising a cationically polymerizable material and a first latent curing component; and a second part comprising a cationically polymerizable material and a second latent curing component which is reactive with the first latent curing component to form cations which are curingly effective for the cationically polymerizable material.

The curingly effective cations may comprise carbenium ions, zwitterions, protons, hydronium ions, or any other positive ions which are useful to cationically polymerize the polymerizable material in the two-part composition, such as an epoxy resin. Such curingly effective cations may be formed by addition, dissociation, or charge transfer initiation reactions between the respective first and second latent curing components.

Various first and second latent curing component species are described in the aforementioned application, including preferred compositions where the first latent curing component is selected from the group consisting of organic halides and water, and the second latent curing component is a silver salt of a non-nucleophilic anion selected from the group consisting of: $SbCl_6^-$, $SbCl_3^-$, $SbF_6^-$, $AsF_6^-$, $SnCl_5^-$, $PF_6^-$, $BF_4^-$, $CF_3SO_3^-$, and $ClO_4^-$.

In use, the above-described two-part compositions are applied one part to each of two matable surfaces, which upon mating of the surfaces results in rapid cure occurring to adhesively bond the respective substrate surfaces. Specifically, when the coated surfaces are mated, the organic halide or water component is dissociated by the silver salt, thereby complexing or otherwise precipitating the halide moiety of the organic halide when same is used as a first latent curing component and forming a carbocationic curing species, or in the case of water, dissociating same to form hydronium ions and/or protonic cationic species effective for curing the cationically polymerizable material. Two-part adhesive compositions of such type utilizing oxirane functional resins as the cationically polymerizable material, e.g., a cycloaliphatic resin, exhibit extremely fast fixturing times, on the order of one minute or less.

One problem with the foregoing compositions is that the silver salts are readily reactive with moisture, resulting in the generation of hydronium ions and/or protons ($H_3O^+/H^+$) which are curingly effective for the resin component of the composition, so that water is usefully employed as a latent curing component in combination therewith. Nonetheless, any atmospheric moisture or water contaminant coming into contact with the silver salt in the silver salt-containing part of the two-part composition, prior to use thereof, may result in undesired premature curing and gellation of the associated resin in such part of the two-part composition.

Accordingly, Ser. No. 821,570 teaches (e.g., at page 17, lines 5–9) to dry the cationically polymerizable material with zeolitic driers, to provide good shelf life "in excess of two months."

Shelf life and moisture susceptibility of the silver salt-containing part are critical factors in the commercial utility of the aforementioned two-part compositions. It is known that the shelf life of the silver-salt containing part of the composition is measurably decreased by exposure to moisture. It would therefore be a significant advance in the art, in view of the superior performance and properties of the two-part compositions disclosed in the aforementioned application, to increase the moisture resistance of the metal salt-containing part to extend its shelf life.

It is therefore an object of the present invention to provide a co-curable composition, having utility as a first part of a two-part composition for contacting with a second part comprising a cationically polymerizable material and a latent curing component, wherein the co-curable composition comprises a cationically polymerizable material and a metal salt of a non-nucleophilic anion, and is characterized by high moisture resistance.

It is another object of the invention to provide a two-part composition comprising as a first part the above-described co-curable composition, and a second part comprising a cationically polymerizable material and a latent curing component which is reactive with the metal salt to form curingly effective cations for the cationically polymerizable material.

Other objects and advantages of the present invention will be apparent from the ensuing disclosure and appended claims.

SUMMARY OF THE INVENTION

In one aspect, the present invention relates to a co-curable composition, having utility as a first part of a two-part cationically curable composition and containing a latent curing component which is reactive with a latent curing component in a second part of the two-part composition to form curingly effective cations for the two-part composition, the co-curable composition comprising:

(a) a cationically polymerizable material; and
(b) a dioxane-complexed metal salt of a non-nucleophilic anion.

The metal in the dioxane-complexed metal salt may be any of a variety of transition metals, alkaline earth metals, and alkali metals, such as for example silver, lithium, calcium, magnesium, sodium, and potassium.

The non-nucleophilic anion moiety of the dixoane-complexed metal salt may be selected from the group consisting of: $SbCl_6^-$, $SbCl_3^-$, $SbF_6^-$, $AsF_6^-$, $SnCl_5^-$, $PF_6^-$, $BF_4^-$, $CF_3SO_3^-$, and $ClO_4^-$.

In another aspect, the present invention relates to a two-part composition curable by contact of respective parts with one another, comprising: a first part comprising a cationically polymerizable material and the aforementioned dioxane-complexed metal salt as a first latent curing component; and a second part comprising a cationically polymerizable material and a second latent curing component which is reactive with the dioxane-complexed metal salt to form cations which are curingly effective for the cationically polymerizable material.

Another aspect of the present invention relates to compositions of the aforementioned type, wherein the cations are formed by addition reaction of the first and second latent curing components.

Another aspect of the present invention relates to compositions of the aforementioned type, wherein the cations are formed by dissociation of the second latent curing component in reaction with the first latent curing component.

Still another aspect of the invention relates to a composition of the above type, wherein the second component is an organic halide and the first component is a silver salt of a non-nucleophilic anion selected from the group consisting of: $SbCl_6^-$, $SbCl_3^-$, $SbF_6^-$, $AsF_6^-$, $SnCl_5^-$, $PF_6^-$, $BF_4^-$, $CF_3SO_3^-$, and $ClO_4^-$.

A further aspect of the invention relates to a two-part composition curable by contact of respective parts with one another, comprising:

a first part comprising an oxirane functional resin and an organic halide of the formula:

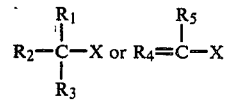

wherein: $R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano; $R_4$ is selected from alkylidene, aralkylidene, and alkenylidene, which may optionally be substituted by alkyl, alkenyl, halo, or cyano; and X is halo; and a second part comprising an oxirane functional resin and a dioxane-complexed metal salt of a non-nucleophilic anion which is reactive with the organic halide to form cations which are curingly effective for the resin.

A still further aspect of the present invention relates to a two-part composition curable by contact of respective parts with one another, comprising: a first part comprising an oxirane functional resin and an organic haldie; and a second part comprising an oxirane functional resin and a dioxane-complexed silver salt of a non-nucleophilic anion.

In another aspect, the present invention relates to a method of producing cured compositions from the aforementioned two-part compositions, comprising contacting the respective first and second parts thereof with one another.

In yet another aspect, the present invention relates to a method of bonding matable surfaces to one another, wherein the first part of the aforementioned two-part composition is applied to a first matable surface and the second part of such composition is applied to a second matable surface, and the first and second matable surfaces are mated to contact the respective first and second parts applied thereto.

DETAILED DESCRIPTION OF THE INVENTION, AND PREFERRED EMBODIMENTS THEREOF

Cationically polymerizable materials which may be cured or polymerized by the cationic species formed by reaction of the first and second latent curing components according to the invention when present in a curingly effective amount, include all suitable materials capable of undergoing cationic polymerization in the presence of such cations, as for example: oxiranes; styryloxy compounds; vinyl ethers; N-vinyl compounds; ethylenically unsaturated hydrocarbons; cyclic formals and cyclic organosiloxanes. Illustrative materials of such types are described in European Patent Application No. 109,851 of M. C. Palazzotto, et al, published May 30, 1984.

Preferred cationically polymerizable materials useful in the broad practice of the present invention include: styryloxy compounds, as for example described in U.S. Pat. No. 4,543,397 of J. Woods, et al; vinyl ethers, including those described in copending U.S. application Ser. No. 600,627 of John Rooney and Paul Conway; and oxiranes, as described below.

As used herein, the terms "oxirane" and "oxirane functional resin" refer to organic compounds having at least one oxirane ring or epoxide (epoxy) group which is polymerizable by ring opening. Such materials generally have at least one polymerizable epoxy group per molecule, preferably two or more such groups per molecule and in the case of polymeric epoxies numerous pendant epoxy groups. Molecular weight of oxirane functional resins useful in the general practice of the present invention may range from about 50 to about 100,000 or higher. Further, it is within the purview of the present invention to utilize mixtures of various oxirane functional resins in the compositions of the invention. Useful oxirane functional resins are described in "Handbook Of Epoxy Resins", Lee and Neville, McGraw Hill Book Company, New York, 1967, and in "Epoxy Resins Chemistry And Technology", May and Tanake, Marcel Dekker Inc., New York, 1973, and include cycloaliphatic epoxies, epoxidized novolacs, diglycidyl ethers of bisphenol-A, i.e., resins resulting from bisphenol-A (4,4'-isopropylidene diphenol) and epichlorohydrin, and extended prepolymers of diglycidyl ethers of bisphenol-A. Epoxy resins particularly useful in the invention include those which contain one or more cyclohexene oxide groups per molecule, such as the epoxycyclohexane carboxylates. Examples of such epoxies include 3,4-epoxycyclohexylmethyl-3,4-epoxycyclohexanecarboxylate, bis (3,4-epoxy-6-methylcyclohexyl-methyl) adipate, vinylcyclohexene dioxide, and 2,(3,4-epoxycyclohexyl5-5,-spiro-3,4-epoxy) cyclohexane metadioxane.

As used herein, the term "metal salt of a non-nucleophilic anion" refers to metal salts of non-nucleophilic acids, suitable non-nucleophilic acids being those which (i) in a 10% by weight water solution have a pH of less than 1.0, and (ii) comprise an anion portion which does not easily participate in displacement reactions with organic halides.

As used herein, the term "carbenium ion" refers to a carbocation species, i.e., an ion containing carbon having a sextet of electrons, as for example, carbocations of the formula:

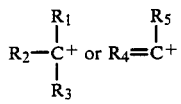

wherein: $R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano; and $R_4$ is selected from alkylidene, aralkylidene, and alkenylidene, which may optionally be substituted by alkyl, alkenyl, halo, or cyano.

As used herein, the term "dioxane-complexed metal salt of a non-nucleophilic anion" refers to salt complexes of the following formula:

D.MX wherein:
B is dioxane;
M is a metal; and
X is a non-nucleophilic anion.

The term "dioxane" as used herein refers to 1,4-diethylene dioxide and any and all substituted and associated forms thereof which are effective to complex with metal salts (MX) generally useful in the broad practice of the present invention. Thus, for example, the dioxane compounds employed for complexing with the metal salt may include those of the formula:

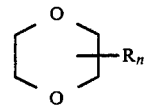

wherein n is zero or an integer of from 1 to 8, and R is any substituent which does not preclude the efficacy of the dioxane compound for complexing with the metal salts of the invention. Thus, R may be any suitable heteroatom group, organic radical or other substituent, it being understood that when n is greater than 1, the R substituents may be the same as or different from one another, further, any of the R groups may be a divalent radical, e.g., alkylidene, aralkylidene, or akenylidene, at one or more ring carbons of the dioxane ring. In preferred practice, dioxane per se, i.e., 1,4-diethylene dioxide, is employed as the complexing agent for the metal salt.

The present invention is based on the surprising and unexpected discovery that dioxane-complexed metal salts of non-nucleophilic anions may be utilized as co-reactants with other latent curing components to form curingly effective cations for cationically polymerizable materials, as a co-curable composition comprising the dioxane-complexed salt and cationically polymerizable material, which has a desirable resistance to moisture reactivity, and imparts physical properties to the cured cationically polymerized material which are strikingly superior to those achievable in formulations containing the corresponding non-complexed metal salts. As an example, the tensile shear strengths of cured epoxy compositions obtained achievable with dioxane-complexed silver salts may be 100% or more above the tensile shear strength levels achievable in corresponding compositions with non-complexed salts.

The metal moiety of the metal salts employed in the dioxane-complexed salts of the invention may suitably include any metal forming a compound with the non-nucleophilic anion which is reactive with another latent curing component to produce cations curingly effective for the cationically polymerizable material in the formulation. Thus, the metal may be selected from among alkali metals, transition metals, and alkaline earth metals. Preferred metal species include silver, lithium, calcium, magnesium, as well as sodium and potassium when their dioxane-complexed salts are compatible with the cationically polymerizable material to be utilized in the composition. Among the foregoing metal species, dioxane-complexed silver salts have been used to specific advantage.

Dioxane-complexing of metal salts in accordance with the present invention overcomes a significant disadvantage of the metal salt-containing cationically polymerizable resin formulations described by our prior copending application U.S. Ser. No. 821,570 filed Jan. 22, 1986, with respect to the water susceptibility (reactivity) of the non-complexed metal salts disclosed therein.

As indicated previously herein, a problem with the compositions disclosed in the above-mentioned prior copending patent application is that the metal salts therein described are readily reactive with moisture, such as may be introduced into the composition by atmospheric humidity or by trace water contamination of the resin or other components of the formulation. The presence of such water in the formulation comprising the cationically polymerizable material and the metal salts, results in the generation of hydronium ions and/or protons ($H_3O^+/H^+$), as a reaction product of water and the metal salt.

Such hydronium ions and/or protons are curingly effective for the cationically polymerizable material, and thus severely limit the shelf life of the cationically polymerizable material containing the non-complexed metal salt, in some instances resulting in premature gellation of the cationically polymerizable material.

Although the preparation of dioxane-complexed anhydrous silver salts, such as $AgBF_4$, $AgPF_6$, and $SbF_6$ has been reported, along with the use of such salts in the polymerization of tetrahydrofuran (THF) under irradiation (photopolymerization) conditions [e.g., see Woodhouse, M. E., et al, "Metal Ion Initiated Charge-Transfer Photopolymerization of Tetrahydrofuran/A Mechanistic Investigation," *J. Am. Chem. Soc.*, 104., pages 5586-5594 (1982)], there has been no recognition that dioxane-complexed metal salts may be utilized in the manner of the present invention to impart physical properties to the cationically cured composition which are surprisingly and unexpectedly superior to those achieved by corresponding compositions utilizing non-complexed metal salts.

With specific reference to sodium and potassium metal salts, such salts per se, i.e., when not complexed with dioxane in the manner of the present invention, are highly water soluble in character, but are not generally organic soluble, so that utilizing such salts in solution with epoxy or other organic resins, organic solvents, etc., has heretofore not been possible. Such organic solubility problem may potentially be overcome in the use of dioxane-complexed sodium and potassium salts, in accordance with the present invention, depending on the choice of the non-nucleophilic anion moiety of the salt and the specific dioxane compound utilized for such complexing.

The compositions of the present invention overcome the constraint of complete mixing requirements associated with cationically cured formulations of the prior art, e.g., epoxy adhesives, which as indicated hereinearlier is frequently at odds with the spontaneous rapid cure character of these formulations, by providing in situ generation of cations which are curingly effective for the cationically polymerizable material.

As used herein, the term "curingly effective" in reference to cations generated by contacting respective parts of the two-part compositions of the present invention, means that the cationically polymerizable material is at least partially polymerized in the presence of such cations, e.g., in the case of oxirane functional resins, the resin in the presence of such cations is polymerized by ring opening of oxirane ring (epoxide) groups.

The curingly effective cations which are useful in the broad practice of the present invention generally include all suitable cationic species which are curingly effective for the specific cationically polymerizable material utilized in the composition, and may comprise carbenium ions, zwitterions, protons, hydronium ions, or any other positive ions which are useful for the intended purpose. It is to be appreciated that the electrochemical mechanism(s) of the cation formation and the curing of the cationically polymerizable material thereby may include concurrent and/or sequential formation of various cationic species which directly or indirectly effect or culminate in curing of the cationically polymerizable material. It is therefore intended that the term "cations" and "curingly effective cations" as used herein be broadly construed to embrace all such cationic curing mechanisms useful for curing including polymerization of cationically polymerizable materials in the compositions of the present invention.

The curingly effective cations are suitably formed by reaction of the dioxane-complexed metal salt, as a first latent curing component contained in one part of a two-part composition, and another latent curing component reactive with the metal salt, contained in the other part of the composition. One useful reaction mechanism for forming such cations is addition reaction of the metal salt latent curing component and the other latent curing component reactive with the metal salt, upon contacting of the respective first and second parts of the composition with one another. Another suitable reaction mechanism comprises dissociating the other latent curing component in reaction with the metal salt latent curing component, when the respective first and second parts of the composition are contacted with one another.

In compositions in which the curingly effective cations are formed by addition reaction of the metal salt and the other latent curing component, these respective the first and second latent curing components each may be present in amounts of from about 0.05 to about 10% by weight, based on the total weight of the composition (inclusive of both parts when the composition is in the form of a two-part formulation), and preferably from about 1 to about 5% by weight, based on the total weight of the composition.

The source of curingly effective cations in the compositions of the present invention may include any dioxane-complexed metal salt and corresponding latent curing components co-reactive therewith, which are generally compatible with the cationically polymerizable materials used in the composition and which suitably react with each other to form the curingly effective cations. Thus, the respective co-reactive latent curing components function in the system as co-catalysts relative to one another.

The formation of curingly effective cations by addition reaction of the first and second latent curing components may suitably comprise the formation of zwitterions as the cationic species, e.g., by charge transfer initiation reaction.

As indicated, another preferred reaction mechanism for forming the curingly effective cations is dissociation of a latent curing component in reaction with the dioxane-complexed metal salt latent curing component, the latter functioning in such co-catalyst system as a dissociation promotor component, i.e., the metal salt is dissociatingly effective for the other latent curing component, causing it to dissociate to form the curingly effective cations.

When dissociation reaction provides the curingly effective cations, the composition of the present invention may be utilized in the form of a two-part composition curable by contact of respective parts with one another, comprising a first part including a cationically polymerizable material and the cation-forming compound, i.e., a first compound dissociatable to form cations which are curingly effective for the material, and a second part including a cationically polymerizable material and the dioxane-complexed metal salt as the dissociation promoting compound, which is reactive with the first compound to cause the first compound to be dissociated to form the curingly effective cations.

Illustrative of useful dissociatable cation source compounds are organic halides, which may be dissociated by dioxane-complexed metal salt co-catalyst components reacting therewith, to complex or otherwise precipitate the halide moiety of the compound.

Illustrative organic halides which have been found to be particularly useful in the practice of the present invention include, but are not limited to, halo compounds of the formula:

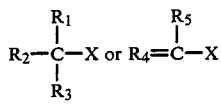

wherein: $R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano; $R_4$ is selected from alkylidene, aralkylidene, and alkenylidene, which may optionally be substituted by alkyl, alkenyl, halo, or cyano; and X is halo.

Preferred compounds of the foregoing formula include those wherein $R_1$, $R_2$, $R_3$, and $R_5$, are independently selected from

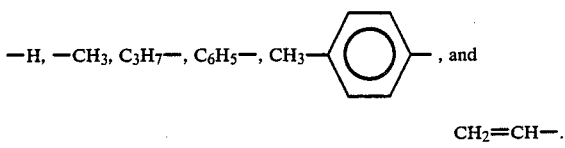

$CH_2=CH-$.

Specific preferred compounds include $(C_6H_5)_3CX$, $(C_6H_5)_2CHX$, $XH_2C(C_6H_4)CH_2X$, $C_3H_7CH_2X$, $(CN)_2C=CHX$, $C_6H_5CH_2X$, $pCH_3C_6H_4CH_2X$, $(CH_3)_3CX$, $(CH_3)_2CHX$, $CH_2=CH-CH_2X$, and most preferred halo compounds include dibromoxylene and iodobutane.

The concentration of the halo compound in the composition of the present invention may suitably range from about 0.05 to about 10% by weight, based on the total weight of the composition (inclusive of both parts when the composition is in the form of a two-part formulation), and preferably from about 1 to about 5%, by weight, based on the total weight of the composition.

The dissociation promoting compound utilized in compositions of the present invention in combination with the aforementioned dissociatable cation source components may comprise any suitable dioxane-complexed metal salt which is generally compatible with the cationically polymerizable material and which is reactive with the latent cation-forming compound to cause such compound to be dissociated to form the curingly effective cations. Illustrative of potentially useful dissociation promoting compounds are dioxane-complexed silver, lithium, calcium, magnesium, sodium, and potassium salts of non-nucleophilic anions. Non-nucleophilic anions potentially useful in such dioxane-complexed metal salts in the broad practice of the present invention include, but are not limited to, $SbCl_6^-$, $SbCl_3^-$, $SbF_6^-$, $AsF_6^-$, $SnCl_5^-$, $PF_6^-$, $BF_4^-$, $CF_3SO_3^-$, and $ClO_4^-$.

Such dioxane-complexed metal salt compounds may be used at any suitable concentration effective to dissociate the cation-forming compound, however in the general practice of the invention concentrations on the order of from about 0.05 to about 10% by weight, based on the total weight of the composition (inclusive of both parts when the composition is in the form of a two-part formulation) will typically be useful, with concentrations of the dioxane-complexed metal salt on the order of from about 1 to about 5% by weight, based on the total weight of the composition, being preferred.

Exemplary compositions of the present invention may, for example, utilize an organic halide in an oxirane resin-containing first part of the composition, wherein the organic halide serves as the compound dissociable to form cations which are curingly effective for the resin, in combination with a dioxane-complexed silver salt of a non-nucleophilic anion, as the dissociation-promoting compound, in a second oxirane functional resin-containing part of the composition.

The mechanism of forming curingly effective cations in such illustrative oxirane functional resin compositions of the present invention, wherein dioxane-complexed silver salts of non-nucleophilic anions are reacted with organic halides, involves the precipitation of silver halide with the concomitant formation of carbocationic species, e.g., carbenium ions, from the organic moiety of the organic halide compound. The kinetic rate of the silver halide formation reaction is sufficiently fast to maintain an extremely high concentration driving force for the carbocation formation, resulting in a high rate of cure when the silver salt-containing part of the composition is brought into contact with the organic halide-containing part of the composition.

In the composition of the present invention, each of the respective first and second parts, i.e., the first part comprising a cationically polymerizable material and first latent curing component, and the second part comprising a cationically polymerizable material and second latent curing component, may suitably comprise a solvent. The solvents in the respective parts of the composition may be the same or different depending on the specific first and second latent curing components employed, however, it is generally preferred in practice to utilize the same solvent in each part of the composition, for reasons of compatibility of the respective parts with one another.

The solvents utilized in the composition will generally have a concentration in the respective parts which is from about 1 to about 4 times the concentration of the catalyst, e.g., the dioxane-complexed metal salt or the organic halide component, in such part.

Suitable solvents for the composition generally include polar solvents, e.g., anhydrous alcohols such as ethanol, tetrahydrofuran, nitromethane, and some ketones, ethers, and esters. Preferably the solvent is non-volatile, non-nucleophilic in character, and substantially moisture-free. Suitable vehicles of such type include polyepichlorohydrin, polybutanes, hydroxy-terminated polybutadienes, carboxy-terminated polybutadienes, polyglycols, and polyglycol esters.

The cationically polymerizable composition of the present invention, or the respective parts thereof, may suitably comprise any additives conventionally used in cationically polymerizable formulations which do not oppose or prevent in situ formation of the curingly effective cations. Illustrative of such additives are fillers, pigments, stabilizers, antioxidants, moisture scavengers, etc. Since alkaline materials retard or inhibit cationic curing, the additives utilized in compositions according to the present invention preferably are non-alkaline or acidic in character. As used in such context, in particular reference to fillers, such non-alkaline or acidic character refers to acidity such as may usefully be determined by ASTM test D 1208-7.8.

Generally, any additives in compositions of the invention should have a low moisture content, preferably less than 0.5% by weight of such additive and most preferably less than about 0.1% by weight. Suitable fillers may include anhydrous aluminum silicates, anhydrous calcium silicates, barytes, kaolin, powdered aluminum, and amorphous silica, e.g., Imsil 54.

The compositions of the present invention are highly advantageous in adhesive applications, and exhibit fixturing times on the order of approximately one minute or less, i.e., when the respective parts of the composition are contacted, the aforementioned fixture times are achieved, with the composition reaching its full properties in a short time thereafter in the manner of cyanoacrylates.

In the use of two-part compositions of the present invention as an adhesive bonding medium, the respective parts may be each be applied to a corresponding matable surface, with rapid cure occurring on mating of the surfaces as the respective parts of the composition are brought into contact with one another. The curing mechanism is cationic in character, with the catalytic species, i.e., curingly effective cations, being generated in situ on diffusion mixing of the respective components. Thus, in such separately applied and subsequently contacted two-part compositions, the composition is cured by cations generated in the bond line at the interface between respective parts. For example, in a composition utilizing a first part comprising an oxirane functional resin and a dioxane-complexed silver salt of a non-nucleophilic anion, and a second part comprising an oxirane functional resin and an organic halide compound, carbenium ions are generated at the bond line by cross-diffusion of organic halide molecules countercurrent to diffusion of the dioxane-complexed silver salt molecules.

Preferably, the cationically polymerizable material in the first part of the composition is the same as the cationically polymerizable material in the second part of the composition, and the concentration of cationically polymerizable material in each of the first and second parts is the same, whereby cross-diffusional concentration driving forces of the first and second latent curing components are maximized, i.e., there is no cross-diffusion of cationically polymerizable material between the respective parts, such as may otherwise interfere with diffusion of the respective co-catalyst components.

Each of the respective parts of the two-part composition of the present invention, utilized as a so-called "two-package system", is highly stable in character, with a shelf life of several months or more, yet on contacting of the respective parts, curing occurs at a rapid rate, e.g., fixturing within one minute and obtension of full properties within one-to-two hours, at ambient (room temperature) conditions.

Although the composition of the present invention has been illustratively referred to as a two-part composition, it will be appreciated that in some instances it may be desirable to utilize additional components or parts with the specific first and second parts described illustratively hereinabove.

In some instances, it may be desirable to utilize the compositions of the invention in the form of two-part compositions, wherein one of such parts contains the cationically polymerizable material and one of the respective co-reactive latent curing components, and the second part comprising the other co-reactive latent curing component without any cationically polymerizable material associated therewith. For example, the composition may comprise a first part containing an oxirane resin in combination with the dioxane-complexed metal salt of a non-nucleophilic anion, while the separately packaged second part of the composition comprises a suitable organic halide compound, in a suitable solvent or other carrier medium which does not include a cationically polymerizable material. In use, the separately packaged, respective composition parts are applied to each of the matable substrate surfaces to be bonded to one another, and upon such mating co-reaction of the organic halide with the dioxane-complexed metal salt occurs, to yield the cationic curingly effective species.

Accordingly, the term "two-part composition" as used herein is intended to be broadly construed to include all such formulations wherein further parts or components are utilized, as well as all such formulations wherein one of the constituent parts comprises one of the respective latent curing components, but does not comprise a cationically polymerizable material therewith. In preferred practice, however, compositions utilizing only two parts, each containing cationically polymerizable material, are desirable, to facilitate packaging and application of the composition.

The features and advantages of the present invention are more fully illustrated with reference to the following non-limiting examples, wherein all parts and percentages are by weight, unless otherwise expressly stated.

EXAMPLE I

A two-part adhesive composition as described in Table I below was prepared, utilizing as the oxirane functional resin a cycloaliphatic resin, CY 179 epoxy (commercially available from Ciba Geigy Corporation, Ardsley, N.Y.). Part A was applied to one test substrate and Part B to a second substrate. On mating of the two substrates, an adhesive bond capable of handling a 3 kg load was formed within seconds. The test substrates were one inch by four inch mild steel lapshear specimens, solvent wiped, and the bond area was one square inch. Fixture time and the ultimate strength developed by the composition, as measured by ASTM D 1002-64, are set forth in Table II below.

TABLE I

| Component | Formulation Concentration, wt. % |
|---|---|
| Part A | |
| Oxirane functional resin | 97.0 |
| Silver Hexafluoroantimonate | 1.0 |
| Anhydrous Ethanol | 2.0 |
| Part B | |
| Oxirane functional resin | 98.0 |
| Dibromoxylene | 1.0 |
| Tetrahydrofuran | 1.0 |

TABLE II

| | |
|---|---|
| Tensile Shear Strength | 1200 psi |
| Fixture Time | 20 seconds |

This example, utilizing dibromoxylene as a carbenium ion-forming compound, in combination with a silver salt of a non-nucleophilic anion, silver hexafluoroantimonate, as a dissociation-promoting compound, shows that complete mixing of the respective parts of the composition, in the manner of prior art formulations, is not required and that simple contact involving diffusional mixing of the co-catalyst compounds, i.e., the organic halide and silver salt, is adequate to produce a high strength bond within a short time after the respective parts of the composition are contacted.

EXAMPLE II

The shelf life of silver salt catalyzed epoxy resins is significantly enhanced by drying the epoxy resin, since, as described above, water can act as a co-catalyst with the silver salt. This example describes a composition disclosed in our prior copending application Ser. No. 821,570, having good shelf life characteristics.

A two-part adhesive composition as described in Table III below was prepared utilizing the same oxirane functional resin as in Example I. This epoxy resin was initially treated with 10 phr of a drying agent, Mobay Zeolith L paste (Mobay Chemical Company) for 24 hours, following which the resin was centrifuged and the nascent liquid used in the preparation of the composition.

Parts A and B were respectively applied to two matable substrates as described in Example I, and upon mating of the substrates, rapid bonding was observed. Tensile shear strength andd fixture time values were determined, as set forth in Table IV below.

Stability of Part A in a high density polyethylene container was determined to be in excess of two months.

TABLE III

| Component | Formulation Concentration, wt. % |
|---|---|
| Part A | |
| Oxirane functional resin | 92.0 |
| Silver Hexafluoroantimonate | 2.0 |
| Anhydrous Ethanol | 6.0 |
| Part B | |
| Oxirane functional resin | 92.0 |
| Dibromoxylene | 2.0 |
| Tetrahydrofuran | 6.0 |

TABLE IV

| | |
|---|---|
| Tensile Shear Strength | 1200 psi |
| Fixture Time | 45 seconds |

EXAMPLE III

The two-part adhesive composition described in Table V below was prepared utilizing the same oxirane functional resin as in Example I, and as the filler HDKH20 silica, commercially available from Wacker Chemie AG, Munich, West Germany. The respective parts likewise were applied to corresponding test substrates in the manner described in Example I. Rapid bonding was achieved and a tensile shear strength of 1020 psi was measured for the bonded substrates.

TABLE V

| Component | Formulation Concentration, wt. % |
|---|---|
| Part A | |
| Oxirane functional resin | 93.0 |
| Silver Hexafluoroantimonate | 1.0 |
| Anhydrous Ethanol | 1.0 |
| Silica | 5.0 |
| Part B | |
| Oxirane functional resin | 91.0 |
| Dibromoxylene | 2.0 |
| Tetrahydrofuran | 2.0 |
| Silica | 5.0 |

EXAMPLE IV

This Example illustrates a composition wherein a polymeric additive, polymethylmethacrylate, is utilized for thickening and reinforcement of the composition.

The composition described in Table VI below was made up utilizing as the oxirane functional resin the epoxy resin of Example I. Respective parts of the composition were applied to corresponding substrates which were mated, in accordance with the procedure of Example I. The tensile shear strength measured was 1133 psi.

TABLE VI

| Component | Formulation Concentration, wt. % |
|---|---|
| Part A | |
| Oxirane functional resin | 82 |
| Polymethylmethacrylate | 10 |
| Silver Hexafluoroantimonate | 2 |
| Anhydrous Ethanol | 6 |
| Part B | |
| Oxirane functional resin | 86 |
| Polymethylmethacrylate | 10 |
| Dibromoxylene | 2 |
| Tetrahydrofuran | 2 |

EXAMPLE V

A two-part adhesive composition as described in Table VII below was prepared, using as the oxirane functional resin a hydrogenated bisphenol-A resin, Epi-Rez 50861, commercially available from Celanese Corporation, New York, N.Y. The respective parts were applied to test substrates and the bonded substrates were evaluated for tensile shear strength in the manner of Example I. Tensile shear strength measured for the sample was 890 psi.

TABLE VII

| Component | Formulation Concentration, wt. % |
|---|---|
| Part A | |
| Oxirane functional resin | 92 |
| Silver Hexafluoroantimonate | 2 |
| Anhydrous Ethanol | 6 |
| Part B | |
| Oxirane functional resin | 96 |
| Dibromoxylene | 2 |
| Tetrahydrofuran | 2 |

EXAMPLE VI

The two-part adhesive composition as described in Table VIII below was prepared, Part A utilizing a 4:1 ratio of Barytes and magnetite as fillers, and Part B utilizing Optiwhite P (commercially avaialble from Burgess Pigment Company, Sandersville, Georgia) as the filler. The same oxirane functional resin as in Example I was employed. Respective parts of the composition were applied to corresponding test substrates and tensile shear strength of the resulting bond was determined, in the manner of Example I. The tensile shear strength value measured for the sample was 847 psi.

TABLE VIII

| Component | Formulation Concentration, wt. % |
|---|---|
| Part A | |
| Oxirane functional resin | 46 |
| Barytes | 40 |
| Magnetite | 10 |
| Silver Hexafluoroantimonate | 1 |
| Anhydrous alcohol | 3 |
| Part B | |
| Oxirane functional resin | 72 |
| Optiwhite P | 25 |
| Dibromoxylene | 1.5 |
| Tetrahydrofuran | 1.5 |

EXAMPLE VII

A two-part adhesive composition was prepared, as described in Table IX below. The oxirane functional resin utilized in each of Parts A and B was Stauffer E 8202-T29 resin (Stauffer Chemical Company, Westport, Conn.), a rubber-modified diglycidyl ether of bisphenol-A. Aluminum powder was utilized as a metallic filler in each of the parts of the composition. The respective parts were applied to corresponding test substrates which were mated and tensile shear strength was determined as in Example I. The measured tensile shear strength value was 1075 psi.

TABLE IX

| Component | Formulation Concentration, wt. % |
|---|---|
| Part A | |
| Oxirane functional resin | 72 |
| Silver Hexafluoroantimonate | 2 |
| Tetrahydrofuran | 6 |
| Aluminum Powder | 20 |
| Part B | |
| Oxirane functional resin | 72 |
| Dibromoxylene | 2 |
| Tetrahydrofuran | 6 |
| Aluminum Powder | 20 |

EXAMPLE VIII

A two-part adhesive composition as described in Table X below was prepared, using the same oxirane functional resin in both parts as in Example I. Iodobutane was employed as the organic halide in Part B. Tensile shear strength and fixture time were determined for this composition in the same manner as Example I, yielding the results shown in table XI below.

TABLE X

| Component | Formulation Concentration, wt. % |
|---|---|
| Part A | |
| Oxirane functional resin | 98.0 |
| Silver Hexafluoroantimonate | 0.6 |
| Anhydrous Ethanol | 1.4 |
| Part B | |
| Oxirane functional resin | 98.0 |
| Iodobutane | 1.0 |
| Tetrahydrofuran | 1.0 |

TABLE XI

| | |
|---|---|
| Tensile Shear Strength | 1300 psi |
| Fixture Time | 25 seconds |

EXAMPLE IX

A dioxane-complexed silver hexafluoroantimonate salt was made by mixing 5 grams of silver hexafluoroantimonate with 60 milliliters of 1.4 M dioxane. Mixing was carried out for 2 hours. The resulting solids generated were filtered under nitrogen atmosphre and vacuum dried for 16 hours, in accordance with the procedure described at page 5587 of the previously mentioned Woodhouse, et al article [*J. Am. Chem. Soc.*, 104, pages 5586–5594 (1982)].

EXAMPLE X

The composition of Table XI below was prepared and Parts A and B applied to one square inch areas of respective four inch by one inch mild steel lapshear specimens. Mated assemblies were produced so that Part A and Part B were diffusively mixed in the bondline. An effective bond was achieved within 10 seconds such that the lapshear specimens could not be disassembled by hand. After 16 hours aging at room temperature (23° C.) tensile shear strengths of 2800 psi were recorded (ASTM D1002).

TABLE XII

| | % |
|---|---|
| Part A | |
| Cycloaliphatic Bisepoxide (Ciba Geigy CY179) | 98 |
| Anhydrous ethanol | 1.4 |
| $AgSbF_6$ Dioxane Complex | 0.6 |
| Part B | |
| Cycloaliphatic epoxy resin (Union Carbide ERL 4206) | 98.0 |
| Tetrahydrofuran | 1.0 |
| 2-Iodobutane | 1.0 |

The cured composition of this example, illustrative of the present invention, showed an extremely high tensile shear strength value of 2800 psi, whereas the corresponding cured formulation of Example VIII herein, comprising a non-complexed silver hexafluoroantimonate salt, exhibited a tensile shear strength of only 1300 psi. Thus, the dioxane-complexing of the silver salt in this illustrative oxirane resin system provided a tensile shear strength improvement in excess of 110%. Such high degree of tensile shear strength increase was surprising and wholly unexpected, and illustrates the magnitude of physical property improvement which is achieved for the cured cationically polymerized composition when dioxane-complexed metal salts of non-nucleophilic anions are employed in accordance with the present invention, as co-curative species in combination with other latent curing components reactive therewith to form curingly effective cations for a cationically polymerizable material.

Although preferred embodiments of the present invention have been described in detail, it will be appreciated that other variants, modifications and embodiments are possible, and accordingly, all such apparent variants, modifications and embodiments are to be regarded as being within the spirit and scope of the present invention.

What is claimed is:

1. A co-curable composition, having utility as a first part of a two-part cationically curable composition and containing a latent curing component which is reactive with a latent curing component in a second part of the two-part composition to form curingly effective cations for the two-part composition, the co-curable composition comprising:
   (a) a cationically polymerizable material; and
   (b) a dioxane-complex metal salt of a non-nucleophilic anion.

2. A co-curable composition according to claim 1, wherein the metal moiety of said dioxane-complexed metal salt is selected from alkali metals, transition metals, and alkaline earth metals.

3. A co-curable composition according to claim 1, wherein the metal moiety of said dioxane-complexed metal salt is selected from the group consisting of silver, lithium, calcium, magnesium, sodium, and potassium.

4. A co-curable composition according to claim 1, wherein said non-nucleophilic anion is selected from the group consisting of: $SbCl_6^-$, $SbCl_3^-$, $SbF_6^-$, $AsF_6^-$, $SnCl_5^-$, $PF_6^-$, $BF_4^-$, $CF_3SO_3^-$, and $ClO_4^-$.

5. A two-part composition curable by contact of respective parts with one another, comprising as a first part, the co-curable composition of claim 1, and a second part comprising a latent curing component which is reactive with said dioxane-complexed metal salt to form cations which are curingly effective for said cationically polymerizable material.

6. A two-part composition curable by contact of respective parts with one another, comprising:
   a first part comprising a cationically polymerizable material and a dioxane-complexed metal salt of a non-nucleophilic anion;
   a second part comprising a cationically polymerizable material and a second latent curing component which is reactive with said dioxane-complexed metal salt to form cations which are curingly effective for said cationically polymerizable material.

7. A composition according to claim 6, wherein said dioxane-complexed metal salt is a dioxane-complexed silver salt of a non-nucleophilic anion.

8. A composition according to claim 6, wherein said second latent curing component is an organic halide of the formula:

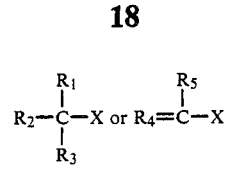

wherein: $R_1$, $R_2$, $R_3$, and $R_5$ may be the same or different and each independently is selected from H, halo, alkyl, aryl, aralkyl, alkaryl, and alkenyl, which may optionally be substituted by alkyl, alkenyl, halo or cyano;

$R_4$ is selected form alkylidene, aralkylidene, and alkenylidene, which may optionally be substituted by alkyl, alkenyl, halo, or cyano; and X is halo.

9. A composition according to claim 6, wherein said non-nucleophilic anion is selected from the group consisting of: $SbCl_6^-$, $SbCl_3^-$, $SbF_6^-$, $AsF_6^-$, $SnCl_5^-$, $PF_6^-$, $BF_4^-$, $CF_3SO_3^-$, and $ClO_4^-$.

10. A two-part composition curable by contact of respective parts with one another, comprising:
   a first part comprising a cationically polymerizable material and a dioxane-complexed silver salt of a non-nucleophilic anion; and
   a second part comprising a cationically polymerizable material and an organic halide of the formula:

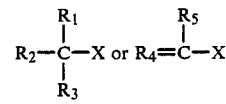

wherein: $R_1$, $R_2$, $R_3$, and $R_5$ may be the same or different and each independently is selected from H, halo, alkyl, aryl, aralkyl, alkaryl, and alkenyl, which may optionally be substituted by alkyl, alkenyl, halo, or cyano;

$R_4$ is selected from alkylidene, aralkylidene, and alkenylidene, which may optionally be substituted by alkyl, alkenyl, halo, or cyano; and X is halo.

11. A composition according to claim 10, wherein X is selected from the group consisting of bromine and iodine.

12. A two-part composition curable by contact of respective parts with one another, comprising:
   a first part comprising a cationically polymerizable material and a dioxane-complexed metal salt of a non-nucleophilic anion; and
   a second part comprising a cationically polymerizable material and an organic halide of the formula:

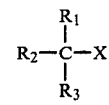

wherein: $R_1$, $R_2$, $R_3$, may be the same or different and each independently is selected from the group consisting of:

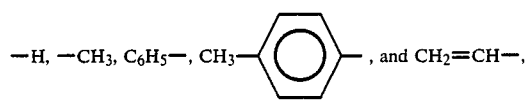

which may optionally be substituted with halo, alkyl, or haloalkyl; and

X is halo.

13. A two-part composition curable by contact of respective parts with one another, comprising:
   a first part comprising a cationically polymerizable material and a dioxane-complexed silver salt of a non-nucleophilic anion; and
   a second part comprising a cationically polymerizable material and an organic halide.

14. A composition according to claim 13, wherein said organic halide is selected from the group consisting of dibromoxylene and iodobutane.

15. A composition according to claim 6, wherein said cationically polymerizable material is selected from the group consisting of: oxiranes, styryloxy compounds; vinyl ethers; N-vinyl compounds; ethylenically unsaturated hydrocarbons; cyclic formals; and cyclic organosiloxanes.

16. A composition according to claim 6, wherein said cationically polymerizable material in each of said first and second parts is an oxirane functional resin.

17. A composition according to claim 16, wherein the oxirane functional resin is each of said first and second parts is the same and is selected from the group consisting of cycloaliphatic epoxies, epoxidized novolacs, diglycidyl ethers of bisphenol-A, and extended prepolymers of diglycidyl ethers of bisphenol-A.

18. A composition according to claim 16, wherein the oxirane functional resin in each of said first and second parts contains at least one cyclohexene oxide group per molecule.

19. A composition according to claim 18, wherein said oxirane functional resin comprises an epoxycyclohexane carboxylate resin.

20. A composition according to claim 16, wherein the oxirane functional resin is selected from the group consisting of:
   3,4-epoxycyclohexylmethyl-3,4-epoxycyclohexane-carboxylate; bis (3,4-epoxy-6-methylcyclohexylmethyl) adipate;
   3,4-epoxy-2-methylclohexylmethyl-3,4-epoxy-2-methylcyclohexane carboxylate; vinyl cyclohexene dioxide; and
   2,(3,4-epoxycyclohexyl-5-5,-spiro-3,4-epoxy)cyclohexane metadioxane.

21. A composition according to claim 6, wherein the cationically polymerizable material in said first part is the same as the cationically polymerizable material in said second part and wherein the concentration of cationically polymerizable material in said first part is equal to the concentration of the cationically polymerizable material in the second part, whereby cross-diffusional concentration driving forces of the metal salt and second latent curing components are maximized in the composition.

22. A composition according to claim 6, further comprising a solvent in each of said first and second parts.

23. A composition according to claim 22, wherein the solvent in each of said first and second parts is nonvolatile, non-nucleophilic, and substantially moisture-free.

24. A composition according to claim 22, wherein the solvent in each of said first and second parts is selected from the group consisting of anhydrous ethanol, tetrahydrofuran, and nitromethane.

25. A composition according to claim 22 wherein the solvent in said first part has a concentration of from about 1 to about 4 times the concentration of said metal salt, and the solvent in said second part has a concentration of from about 1 to about 4 times the concentration of said second latent curing component.

26. A composition according to claim 6, wherein each of the dioxane-complexed metal salt and the second latent curing component has a concentration of from about 0.05 to about 10% by weight, based on the total weight of the composition.

27. A composition according to claim 6, wherein each of the dioxane-complexed metal salt and the second latent curing component has a concentration of from about 1.0 to about 5.0 percent by weight, based on the total weight of the composition.

28. A two-part composition curable by contact of respective parts with one another, comprising:
   a first part comprising an oxirane functional resin and an organic halide of the formula:

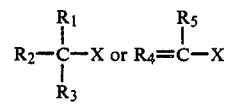

wherein: $R_1$, $R_2$, $R_3$ and $R_5$ may be the same or different and each independently is selected from H, halo, alkyl, aryl, aralkyl, alkaryl, and alkenyl, which may optionally be substituted by alkyl, alkenyl, halo, or cyano;
   $R_4$ is selected from alkylidene, aralkylidene, and alkenylidene, which may optionally be substituted by alkyl, alkenyl, halo, or cyano; and X is halo.
   a second part comprising an oxirane functional resin and a dioxane-complexed metal salt of a non-nucleophilic anion.

29. A two-part composition curable by contact of respective parts with one another, comprising:
   a first part comprising an oxirane functional resin and an organic halide; and
   a second part comprising an oxirane functional resin and a silver salt of a non-nucleophilic anion.

30. A method of forming a cured composition from the two-part composition of claim 6, comprising contacting said first part and said second part with one another.

31. A method of bonding matable surfaces to one another, wherein said first part of said two-part composition of claim 6 is applied to a first matable surface and said second part thereof is applied to a second matable surface, and said first and second matable surfaces are mated to contact the respective first and second parts applied thereto.

32. A cured composition formed from the two-part composition of claim 6 by contacting said first part and said second part with one another.

* * * * *